United States Patent [19]

Ohsawa et al.

[11] Patent Number: 5,126,838
[45] Date of Patent: Jun. 30, 1992

[54] COLOR IMAGE PROCESSING WITH UNDERCOLOR REMOVAL SUITABLE FOR USE IN DIGITAL PROCESSING

[75] Inventors: Hidefumi Ohsawa, Kawaguchi; Kenichi Ohta; Akihiro Usami, both of Yokohama, all of Japan

[73] Assignee: Canon Kabushiki Kaisha, Tokyo, Japan

[21] Appl. No.: 657,389

[22] Filed: Feb. 19, 1991

Related U.S. Application Data

[63] Continuation of Ser. No. 267,366, Nov. 4, 1988, abandoned.

[30] Foreign Application Priority Data

Nov. 20, 1987 [JP] Japan .................. 62-293794
Feb. 5, 1988 [JP] Japan .................. 63-23838

[51] Int. Cl.$^5$ .................................................. H04N 1/46
[52] U.S. Cl. ........................................ 358/75; 358/443
[58] Field of Search ..................... 358/75, 443, 80

[56] References Cited

U.S. PATENT DOCUMENTS

| | | | |
|---|---|---|---|
| 4,213,150 | 7/1980 | Robinson et al. | 358/166 |
| 4,547,811 | 10/1985 | Ochi et al. | 358/280 |
| 4,642,681 | 2/1987 | Ikeda | 358/79 |
| 4,663,662 | 5/1987 | Sekizawa et al. | 358/75 |
| 4,682,216 | 7/1987 | Sasaki et al. | 358/75 |
| 4,700,399 | 10/1987 | Yoshida | 358/79 |
| 4,724,477 | 2/1988 | Ellis et al. | 358/79 |
| 4,742,400 | 5/1988 | Tsuji | 358/284 |
| 4,878,125 | 10/1989 | Katayama et al. | 358/443 |

FOREIGN PATENT DOCUMENTS 59-205876  11/1984  Japan .

*Primary Examiner*—James J. Groody
*Assistant Examiner*—M. Powell
*Attorney, Agent, or Firm*—Fitzpatrick, Cella, Harper & Scinto

[57] ABSTRACT

An image processing apparatus extracts an edge or line portion of an image, judges grayness of the image, and processes the image according to outputs of the means used for the edge- or line-extraction and grayness-determination. The further processing may, for example, comprise undercolor removal and/or black-addition. Edge extraction can be performed by use of a Laplacian. The grayness can be judged by, for example, providing a colorlessness signal formed from two color component signals. Extraction of a line region, instead of Laplacian edge extraction, can be performed, for example, by use of an Hadamard transformation. Also, the invention more generally includes detecting grayness of an image, detecting other characteristics of the image, and judging additional characteristics of the image according to the first two determinations.

55 Claims, 8 Drawing Sheets

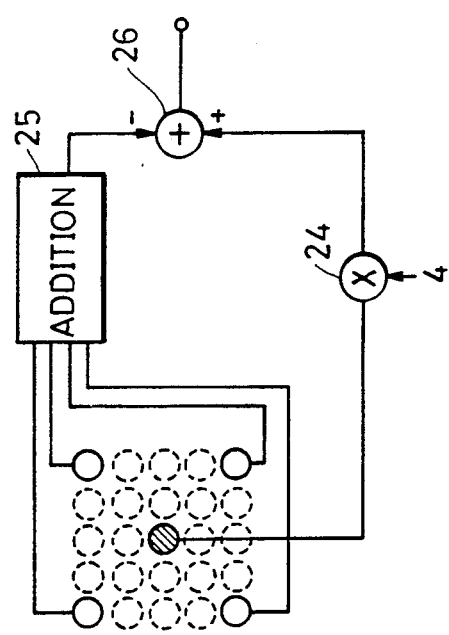
FIG. 2 (1)
FIG. 2 (2)
```
-1 0 0 0 -1
 0 0 0 0 0
 0 0 4 0 0
 0 0 0 0 0
-1 0 0 0 -1
```
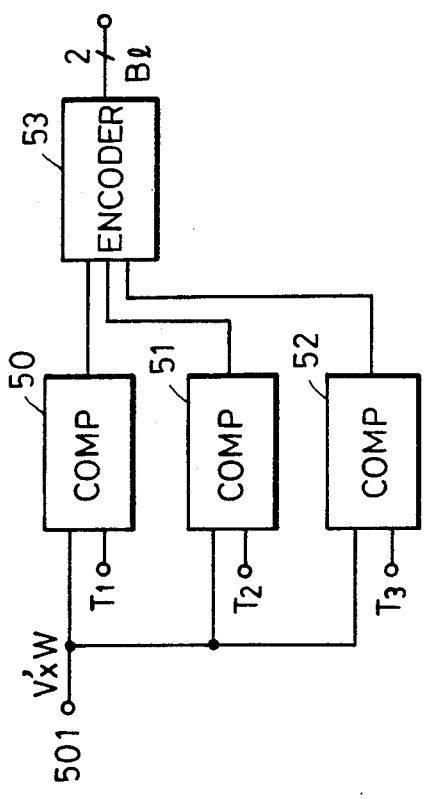
FIG. 5 (1)
FIG. 5 (2)
| $\ell_1$ $\ell_2$ $\ell_3$ | $B\ell$ |
|---|---|
| 0 0 0 | 0 0 |
| 1 0 0 | 0 1 |
| 1 1 0 | 1 0 |
| 1 1 1 | 1 1 |

FIG. 6 (1)
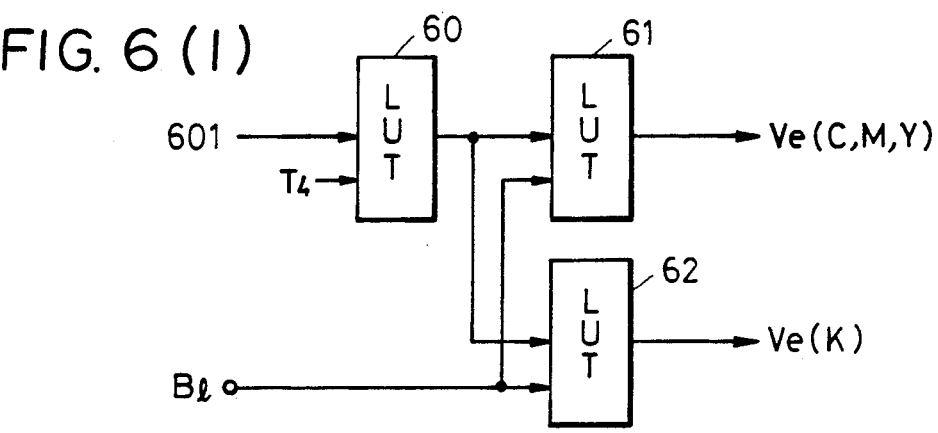
FIG. 6 (2)
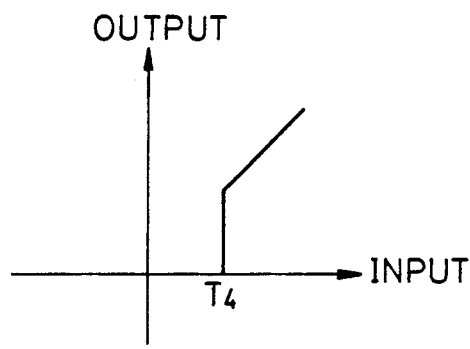
FIG. 6 (3)
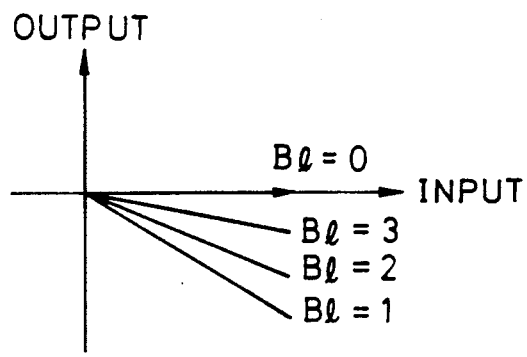
FIG. 6 (4)
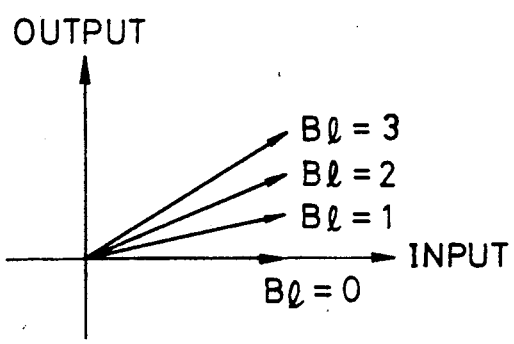

FIG. 7 (1)
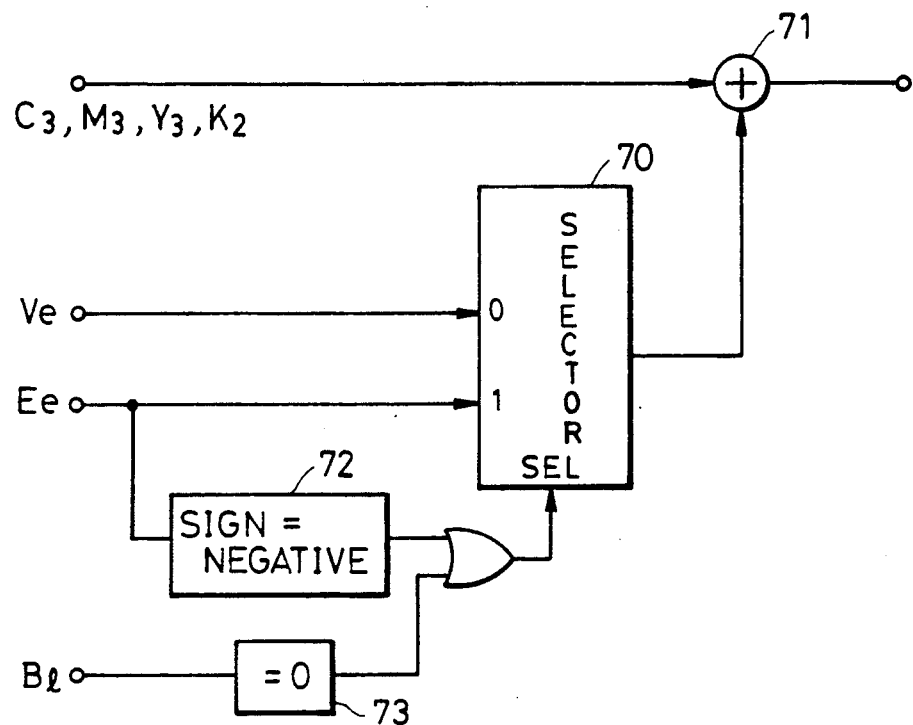
FIG. 7 (2)
| B$\ell$ | Ee > 0 | Ee < 0 |
|---|---|---|
| 0 | Ee | Ee |
| 1 | Ve | Ee |
| 2 | Ve | Ee |
| 3 | Ve | Ee |

COLOR IMAGE PROCESSING WITH UNDERCOLOR REMOVAL SUITABLE FOR USE IN DIGITAL PROCESSING

This application is a continuation of application Ser. No. 07/267,366, filed Nov. 4, 1988, now abandoned.

BACKGROUND OF THE INVENTION

1. Field of the Invention

This invention relates to a color image processing apparatus in which undercolor removal is performed in a digital color copier or the like.

2. Description of the Prior Art

Conventional color image processing apparatus use inks of four colors, i.e., yellow, magenta, cyan and black, and obtain a full color image by the subtraction color-mixing method.

For representing a black region on a manuscript, there are, in general, two methods: a method in which black is represented by printing, with overlapping, inks of three colors, i.e., yellow, magenta and cyan; and a method in which black is represented by printing black ink instead of printing inks of three colors, yellow, magenta and cyan. One or the other of these methods is selectively used, depending on the situation.

Now, the undercolor removal ("UCR") method used in printing or the like is a method in which the smallest, or minimum, from among the respective amounts of yellow, magenta and cyan inks is determined, the actual amount of each ink to be used is reduced according to the determined minimum amount, and the total amount of the reduction (the amount of inks thus reduced) is replaced by black ink.

Thus, it becomes possible to reproduce a black which has an optical density higher than that of a black produced by printing, with overlapping, yellow, magenta and cyan inks. Moreover, it is possible to reduce the amount of consumption of yellow, magenta and cyan inks.

However, when all of the black of a region is replaced by black ink (100% UCR), half-tone images become rough. Hence, 100% UCR can not be put into practice, and yellow, magenta and cyan inks are printed, with overlapping, on a part of the above-described black region.

When yellow, magenta and cyan inks are printed with overlapping on a part of the black region as described above, there are problems in that yellow, magenta and cyan inks remain also in a black-letter region, and the influence of imperfect registration and dispersion of inks can become remarkable, deteriorating the quality of black letters.

Japanese Patent Provisional Publication No. 59-205,876 (1984), counterpart of U.S. patent application Ser. No. 07/058,625, filed June 4, 1987, a continuation of U.S. patent application Ser. No. 06/608,238, filed May 8, 1984, has disclosed an apparatus in which color-separated R, G and B signals are converted into four-primary-color signals, Y, M, C and K, and subsequently it is judged, using only the K signal, whether an image region in question is a high-resolution region, such as a letter image or the like, or a region which does not require high resolution, such as a photographic image or the like. Then, when it is judged a high-resolution region, all the four colors, Y, M, C and K, are output in binary numbers, and when it is a photographic region, all the four colors, Y, M, C and K, are output in multiple (multibit) numbers as they are.

There is also another apparatus in which image-region identification is independently performed for each of the Y, M, C and K signals to determine whether each color should be output in binary numbers or in multiple (multibit) numbers as it is, according to the identification result.

However, when image-region identification is independently performed for each of the Y, M, C and K signals, the identification result sometimes is different for each color, and the resulting output image tends to have uneven color, blurred color or the like.

Moreover, when image-area identification is performed using only K signals, the following inconvenience, for example, can occur. Suppose that an object picture element is represented by each of four 8-bit digital signals Y, M, C and K, and, for example, Y=255, M=255, C=150 and K=min. (Y, M, C)=150, i.e., a blackish red color. When the object picture element is judged to be a picture element in a letter region according to the status of the K signal of a neighboring picture element thereof, all of the Y, M, C and K signals are converted into binary numbers. Hence, if the threshold value for converting into a binary number is assumed to be 128 which is an intermediate level, binary-number output of the object picture element becomes Y=M=C=K=1 (level 255), and the picture element is replaced by a completely dense black.

U.S. Pat. No. 4,700,399 and U.S. patent application Ser. No. 07/173,654, filed Mar. 25, 1988, both assigned in common with the present invention, disclose other image processing apparatus, but those apparatus leave room for improvement in respect of the objects of the present invention.

SUMMARY OF THE INVENTION

It is an object of the present invention to provide a color image processing apparatus in which black regions in a color image can be satisfactorily reproduced.

It is another object of the present invention to provide a color image processing apparatus in which black letter regions in a color image can be satisfactorily reproduced.

It is a further object of the present invention to provide an image forming apparatus which is capable of effectively detecting only genuine black and reproducing black which is excellent in quality.

These objects are achieved, according to preferred embodiments of the present invention, by providing a color image processing apparatus in which the amount of each of yellow, magenta and cyan ink in a colorless black and edge region is reduced according to an edge-amount, and the amount of black ink in a colorless black and edge portion is increased according to said edge-amount, and hence the amounts of yellow, magenta and cyan inks in a black letter region decrease, and the amount of black ink increases to improve the quality of black letters.

Still further objects and features of the present invention will become apparent from the following detailed description of the preferred embodiments, taken in connection with the accompanying drawings.

BRIEF DESCRIPTION OF THE DRAWINGS

FIG. 2 (1) is a block diagram showing an edge extraction circuit in the above-described embodiment;

FIG. 2 (2) is an explanatory diagram of FIG. 2 (1);

FIG. 5 (1) is a block diagram showing a level detector in the above-described embodiment;

FIG. 5 (2) is a diagram for use in explaining FIG. 5 (1);

FIG. 6 (1) is a diagram showing an edge-amount conversion table circuit in the above-described embodiment;

FIGS. 6 (2), (3) and (4) are explanatory diagrams of the edge-amount conversion table circuit;

FIG. 7 (1) is a block diagram showing an edge emphasis circuit in the above-described embodiment;

FIG. 7 (2) is a logic table;

DESCRIPTION OF THE PREFERRED EMBODIMENTS

Figure 1:
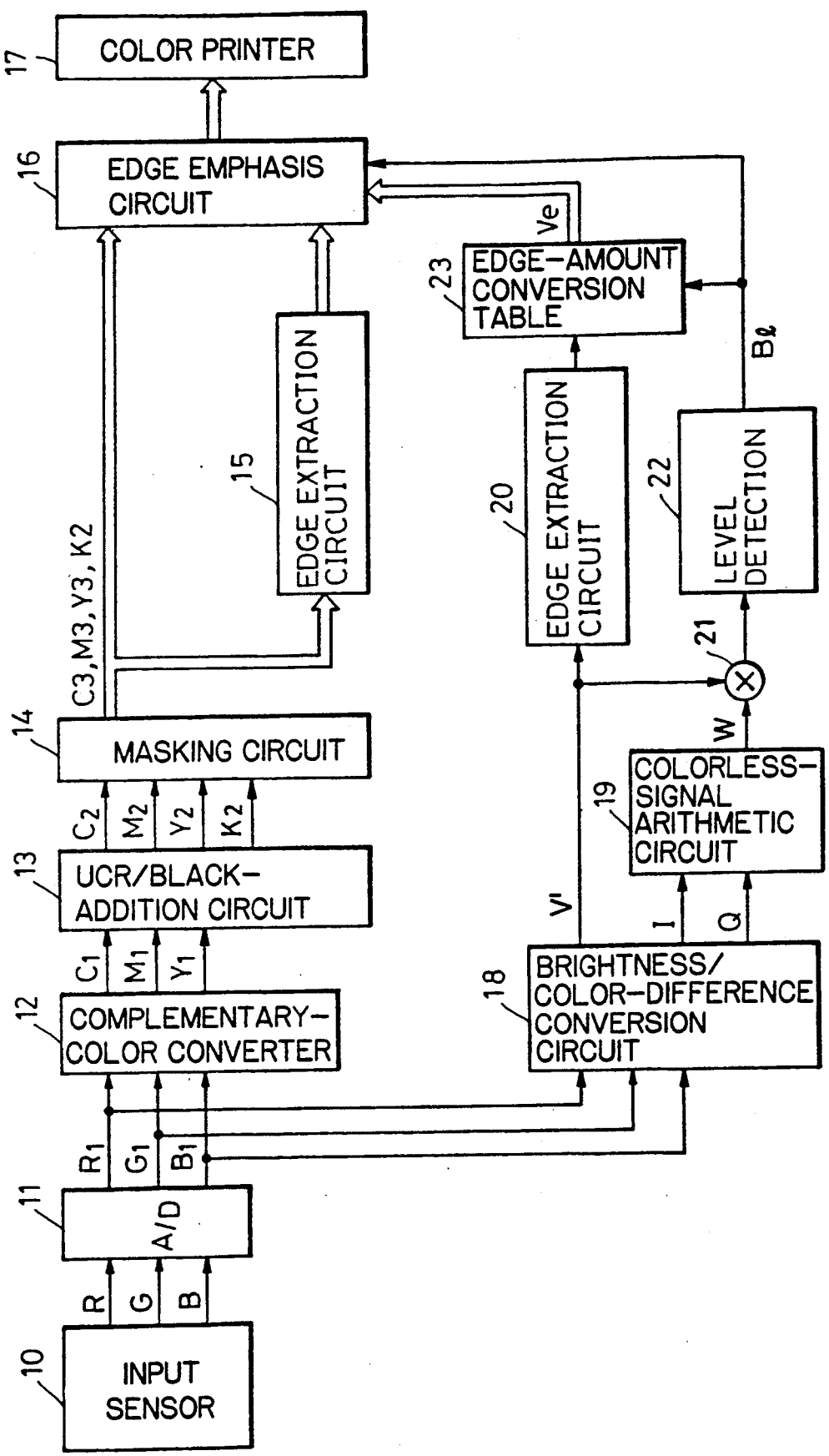
FIG. 1 is a block diagram showing an embodiment of the present invention.

FIG. 1 is a block diagram showing an embodiment of the present invention.

In the embodiment, there are provided an input sensor 10, and A/D conversion circuit 11, a complementary-color converter 12, a UCR/black-addition circuit 13, a masking circuit 14, an edge extraction circuit 15, an edge emphasis circuit 16, a color printer 17, a brightness/color-difference conversion circuit 18, a colorless-signal arithmetic circuit 19, an edge extraction circuit 20, a multiplier 21, a level detector 22 and an edge-amount conversion table 23.

The input sensor 10 reads a document or the like by means of a photoelectric conversion unit, such as a CCD camera or the like, and outputs color separation signals of three colors, R, G and B. The A/D converter 11 converts the color separation signals into 8-bit digital signals representing gradation in 256 stages for each color. The complementary-color converter performs density conversion and outputs signals $C_1$, $M_1$ and $Y_1$ which represent amounts of inks of three colors, cyan, magenta and yellow, respectively. The UCR/black-addition circuit 13 performs undercolor removal (UCR) and black-addition processing.

The masking circuit 14 performs color correction which removes turbidity components in color separation filters and inks. The edge extraction circuit extracts an edge component Ee from each color signal. The brightness/color-difference conversion circuit 18 is a circuit which outputs luminance signal V (actually, the inverse V' of V) and color component signals I and Q according to the R, G and B signals.

The edge emphasis circuit 16 selects either the edge component Ee or an output Ve of the edge-amount conversion table 23 according to a level value Bl and the sign of the edge component Ee, and adds color signals $C_3$, $M_3$, $Y_3$ and $K_2$ to the selected signal to perform edge emphasis. It will be noted that the edge component is output by applying a Laplacian operator to an image.

The colorless-signal arithmetic circuit 19 is a circuit which converts color component signals I and Q into colorless signal W. This circuit is an example of means for detecting colorless regions in a color manuscript.

The multiplier 21 multiplies the colorless signal W by the luminance signal V'. The level detector 22 divides an output of the multiplier 21 into a 4-stage level value Bl.

The edge-amount conversion table 23 is a table which converts an extracted edge-amount according to a black level detected by the level detection circuit 22.

Now, the operations of the above-described embodiment will be explained.

The input sensor 10 outputs color-separation signals of three colors R, G and B, the A/D conversion circuit 11 converts these signals into 8-bit digital signals $R_1$, $G_1$ and $B_1$, and the complementary-color converter 12 further converts these signals into $C_1$, $M_1$ and $Y_1$. Then, the UCR/black-addition circuit 13 performs undercolor removal and black-addition processing. That is, $$K_1 = min(Y_1, M_1, C_1) \qquad \text{Formula (1)}$$

is determined to obtain the minimum-value of signals $C_1$, $M_1$ and $Y_1$, and further signals $C_2$, $M_2$, $Y_2$ and $K_2$ are obtained by the following Formula (2):

$$Y_2 = Y_1 - \alpha Y \times (K_1 - \beta Y)$$

$$M_2 = M_1 - \alpha M \times (K_1 - \beta M)$$

$$C_2 = C_1 - \alpha C \times (K_1 - \beta C)$$

$$K_2 = \alpha K \times (K_1 - \beta K) \qquad \text{Formula (2)}.$$

Further, the masking circuit 14 outputs color-corrected signals $Y_3$, $M_3$ and $C_3$ by the following Formula (3):

$$Y_3 = \alpha_{11} \cdot Y_2 + \alpha_{21} \cdot M_2 + \alpha_{31} \cdot C_2$$

$$M_3 = \alpha_{12} \cdot Y_2 + \alpha_{22} \cdot M_2 + \alpha_{32} \cdot C_2$$

$$Y_3 = \alpha_{13} \cdot Y_2 + \alpha_{23} \cdot M_2 + \alpha_{33} \cdot C_2 \qquad \text{Formula (3)}.$$

where $\alpha_{11} - \alpha_{33}$ are parameters which are experimentally determined.

Further, the brightness/color-difference conversion circuit 18 determines a luminance component V of an image according to the R, G and B signals, and color component signals I and Q according to, for example, the following Formula (4):

$$V = 0.30 \times R_1 + 0.59 \times G_1 + 0.11 \times B_1$$

$$I = 0.60 \times R_1 - 0.28 \times G_1 - 0.32 \times B_1$$

$$Q = 0.21 \times R_1 - 0.52 \times G_1 - 0.31 \times B_1 \qquad \text{Formula (4)}.$$

Color component signals I and Q are signals which become 0 for a colorless region. The signal V is a luminance signal which indicates brightness. The luminance signal V becomes an inverted signal V' when it is output from the brightness/color-difference conversion circuit 18. The signal V' is a signal the value of which becomes larger as an image is darker. The edge extraction circuit 20 extracts an edge of the luminance signal according to the signal V'. Further, the arithmetic circuit 19 converts the color component signals I and Q into a colorless signal W by the following Formula (5):

$$W = 255 \times exp[-(16 \times I/255)^2 - (16 \times Q/255)^2] \quad \text{Formula (5)}.$$

Then, the multiplier 21 multiplies the signal W by the signal V'. The value of signal V'×W which is the result of the multiplication becomes large when an image is colorless and moreover black. An output of the multiplier 21 is divided into a 4-stage level value Bl in the level detector 22. The edge emphasis circuit 16 then selects either the edge component Ee or the output Ve according to the value of the level value Bl and the sign of the edge component Ee. Color signals $C_3$, $M_3$, $Y_3$ and $K_2$ are added to the selected signal to thereby perform edge emphasis. On this occasion, the output Ve is selected when an image is a black letter which has a large level value Bl.

It will be noted that the conversion table 23 is adjusted so that a minus value is obtained for the Y, M and C signals, and a plus value is obtained for the K signal. Accordingly, the Y, M and C signals are decreased, and the K signal is increased in a black-letter region, and hence a black letter is printed almost as a unicolor consisting of black. This results in improvement in quality of black letters.

FIG. 2 (1) is a block diagram showing an example of edge extraction circuits 15 and 20 in the above-described embodiment.

In the above-described embodiment, edge extraction is performed by Laplacian operation. That is, the difference between four times the value of a value of a central picture element (a picture element shown by hatching in FIG. 2 (1)) (output by a multiplier 24), and the sum of the values of four picture elements around the central picture element, is taken by an adder-subtractor 26. Thus, an edge-amount of a region consisting of 5×5 picture elements as shown in FIG. 2 (2) is extracted by a Laplacian operation.

Figure 3:
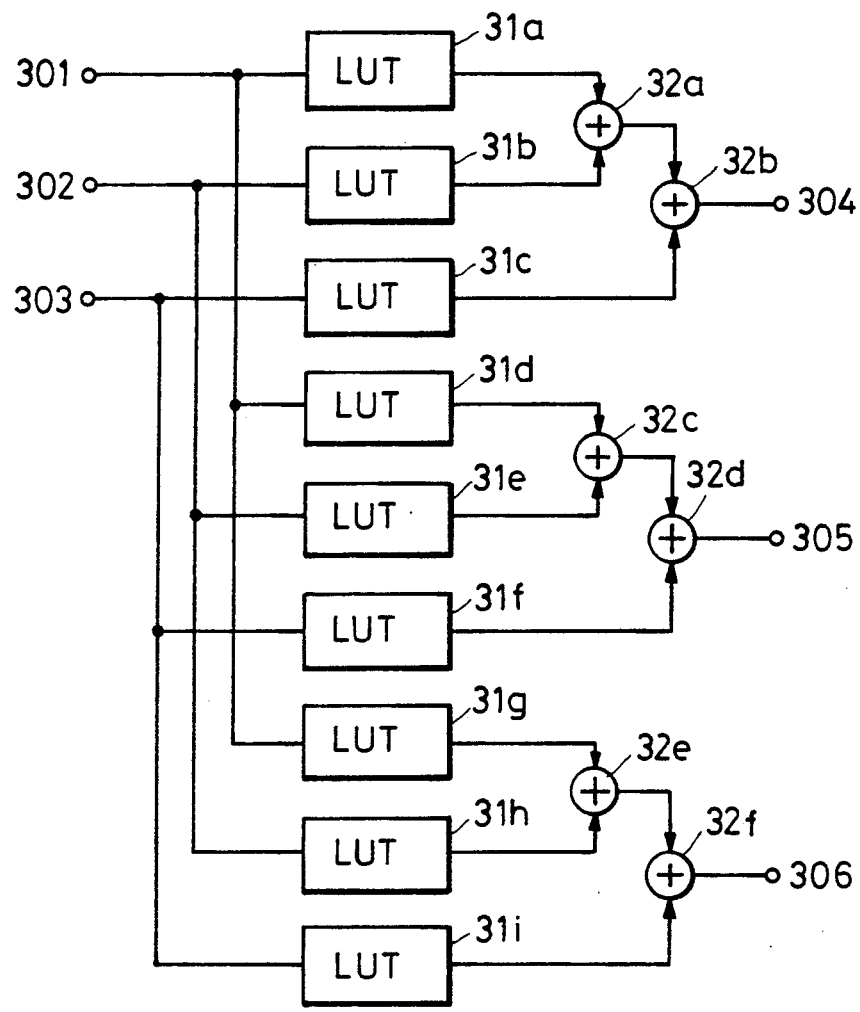
FIG. 3 is a block diagram showing a masking circuit and a brightness/color-difference conversion circuit in the above-described embodiment.

FIG. 3 is a block diagram showing an example of the masking circuit 14 and the brightness/color-difference conversion circuit 18.

When input signals 301, 302 and 303 pass through LUT's 31a-31i, they are multiplied by a predetermined coefficient, and subsequently are added by adders 32a-32f. Data at outputs 304, 305 and 306, resulting from the linear tranformations shown by Formulas (3) and (4), are thereby obtained.

Figure 4:
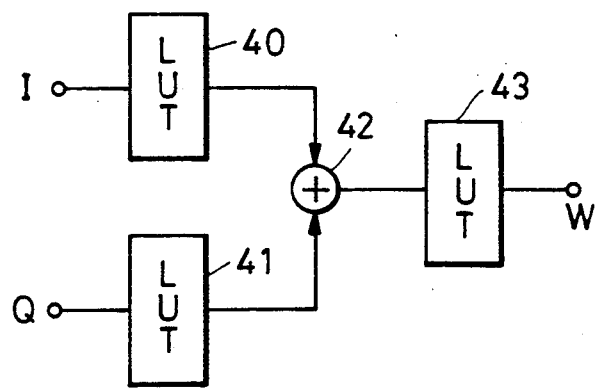
FIG. 4 is a block diagram showing a colorless-signal arithmetic circuit in the above-described embodiment.

FIG. 4 is a block diagram showing an example of the colorless-signal arithmetic circuit 19.

LUT's 40 and 41 determine the values $(16 \times I/255)^2$ and $(16 \times Q/255)^2$, the adder 42 adds the results, and an LUT 43 calculates $$W = 255 \times exp(-X),$$

where $X = (16 \times I/255)^2 + (16 \times Q/255)^2$.

FIG. 5 (1) is a block diagram showing an example of the level detector 22 in the above-described embodiment.

Comparators 50, 51 and 52 compare the input signal V'×W with threshold values T1, T2 and T3. When the above-described input signal is larger than T1, T2 and T3, output signals l1, l2 and l3 are all equal to 1. An encoder 53 encodes the above-described output signals l1, l2 and l3 according to a logic table as shown in FIG. 5 (2), and determines a level value Bl. That is, the level value Bl become 0, 1, 2 and 3 in the ascending order of the input signals V'×W.

FIG. 6 (1) is a block diagram showing an example of the edge-amount conversion table 23.

An LUT 60 cuts out signals in input signals 601 which are not larger than T4, as shown in FIG. 6 (2).

An LUT 61 converts edge signals Ve (C, M, Y) to be added to the Y, M and C signals, according to the graph shown in FIG. 6 (3). This graph switches an input according to a value of the level value Bl. An LUT 62 also converts an edge signal Ve (K) to be added to the K signal according to the graph shown in FIG. 6 (4). This graph also switches an input according to a value of the level value Bl.

FIG. 7 (1) is a block diagram showing an example of the edge emphasis circuit 16 in the above-described embodiment.

A sign detector 72 detects that a sign of an edge component Ee showing an edge-amount is negative, and outputs 1 on this occasion. On the other hand, a level detector 73 outputs 1 when it detects that the level value Bl = 0.

When the sign detector 72 outputs 1 or the level detector 73 outputs 1, a selector 70 outputs an edge component Ee. When the edge component Ee is 0, the selector 70 selects Ve.

That is, when the edge is negative, or the level value is 0, i.e., black regions in an object image are small, normal edge emphasis in performed. And when the edge is positive, i.e., black regions in an object image are large, the level of K becomes large, and black letters are printed by a nearly unicolored black.

FIG. 7 (2) is a logic table showing which one, as between the edge component Ee and Ve, is selected by the selector 70 according to the sign of the edge component Ee and the value of the level value Bl in the above-described embodiment.

Figure 8:
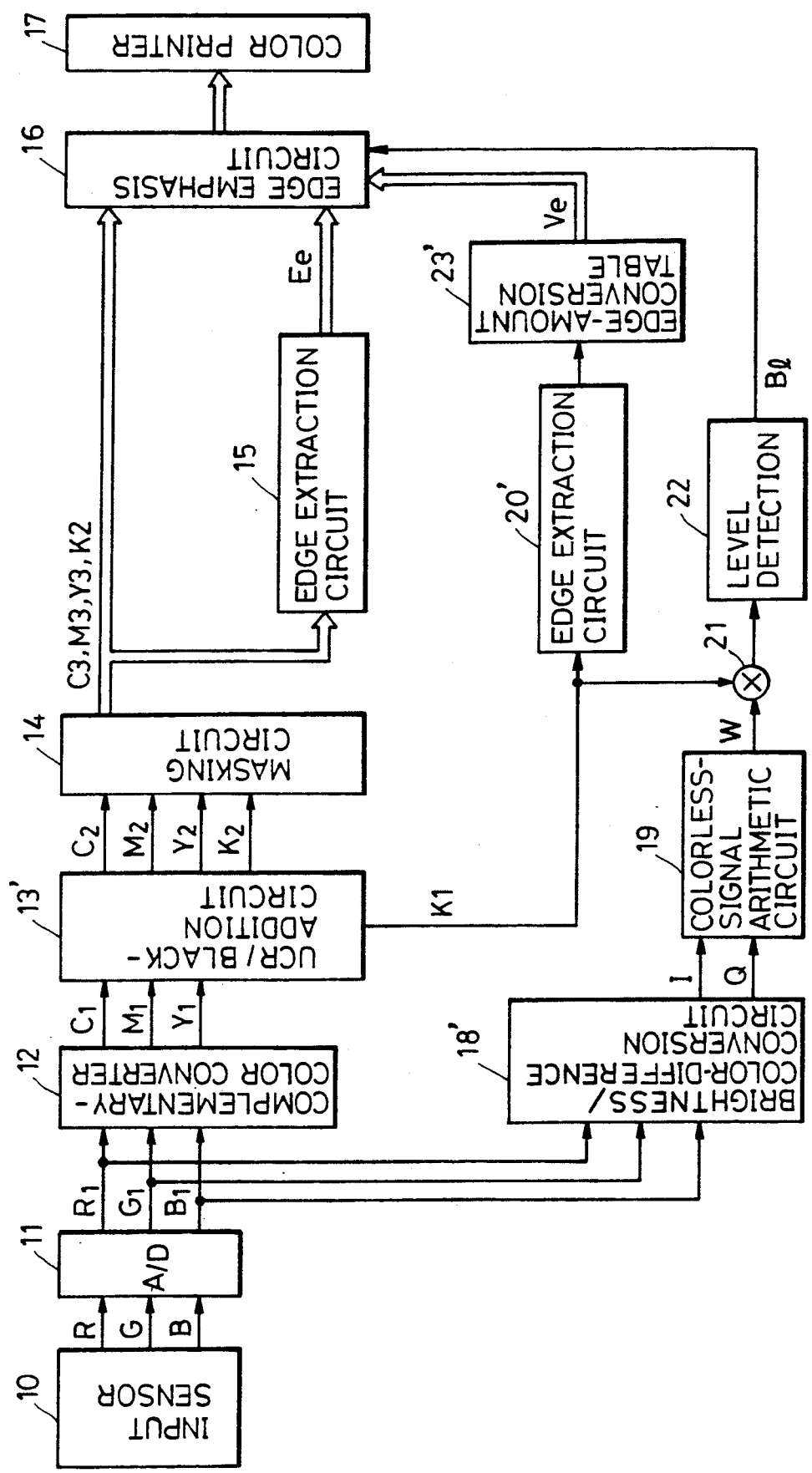
FIG. 8 is a block diagram showing another embodiment of the present invention.

FIG. 8 is a block diagram showing another embodiment of the present invention.

The embodiment of FIG. 8 uses K1 = min (Y, M, C) signal instead of the luminance signal V' shown in FIG. 1. It is possible thereby to reduce the size of a matrix arithmetic unit of the color-difference conversion circuit 18 to ⅔.

It is possible to consider several means as means for obtaining the colorless signal W. The colorless signal W may be obtained, for example, by using the following Formulas (6), (7) and (8):

$$L = -\log V$$

$$C_1 = -\log R_1$$

$$M_1 = -\log G_1$$

$$Y_1 = -\log B_1 \quad \text{Formula (6)}.$$

$$Ar = C_1 - L$$

$$Ab = Y_1 - L \quad \text{Formula (7)}.$$

$$W = Kb \times exp[-(4Ar/Kw)^2 - (4Ab/Kw)^2] \quad \text{Formula (8)}.$$

where Kb and Kw are constants.

The present embodiment has the effect that the amounts of yellow, magenta and cyan inks are reduced, and the amount of black ink is increased in black-letter regions, to improve quality of black letters.

Now, a further embodiment of the present invention will be explained.

Figure 9:
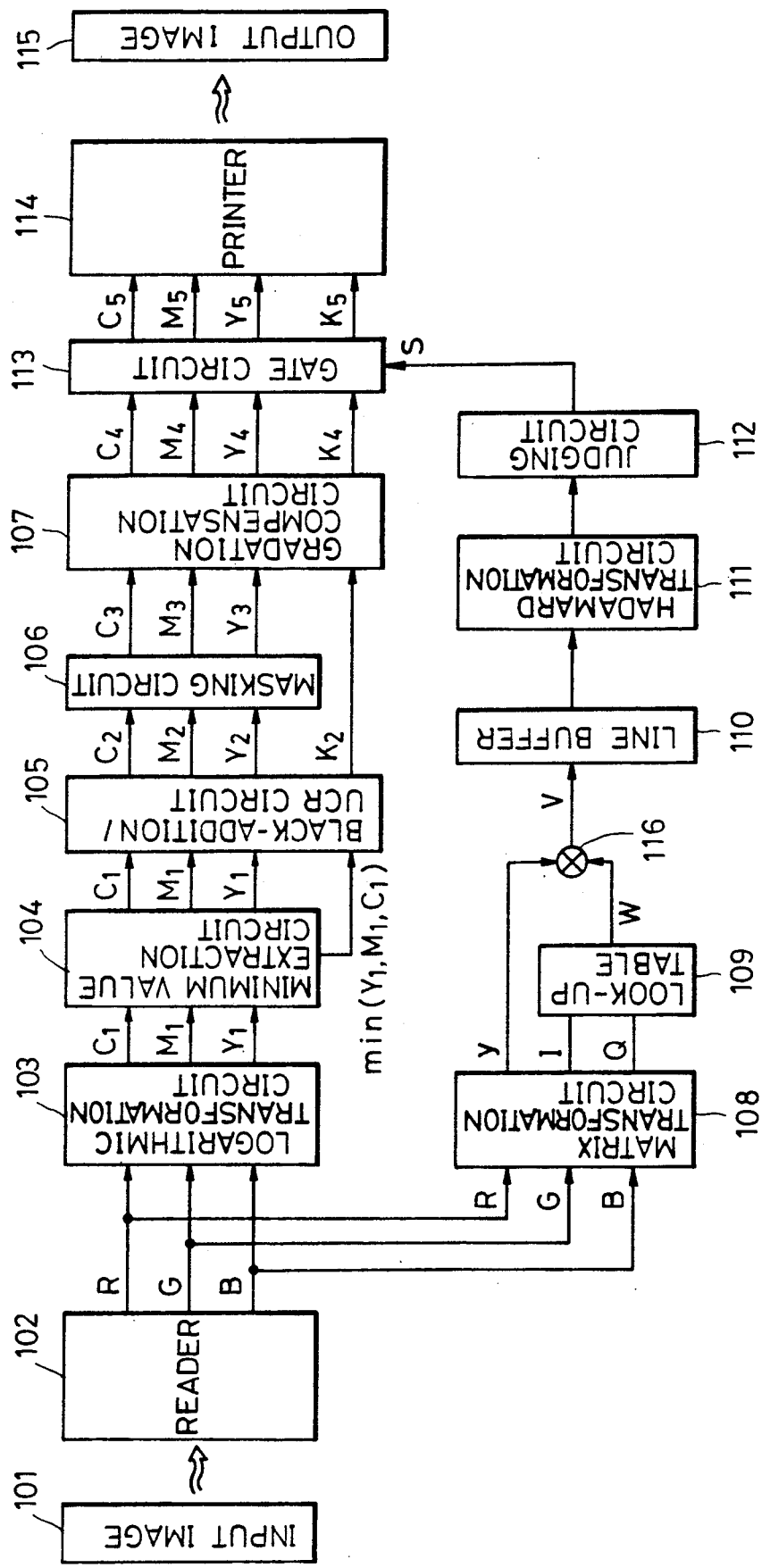
FIG. 9 is a block diagram of a digital color copier as a further embodiment of the present invention.

FIG. 9 is a block diagram of a digital color copier of this embodiment. In FIG. 9, an input image 101 is, for example, an image of a color document in which letter images, photographic images or the like are mixed. A reader 102 reads the image 101 of the color document by performing color separation into three primary colors, R, G and B, and performs A/D conversion of those three read signals to output digital image signals (luminance signals) R, G and B (8 bits for each). A logarithmic transformation circuit 103 performs logarithmic transformation of luminance signals R, G and B, and outputs density signals $C_1$, $M_1$ and $Y_1$ which are the results of that transformation. A minimum value extraction circuit 104 lets the input density signals $C_1$, $M_1$ and $Y_1$ pass as they are, and at the same time detects and outputs the minimum value signal min ($Y_1$, $M_1$, $C_1$) from among them. A black-addition/UCR circuit 105 produces black-addition (black) signal $K_2$ according to the input minimum value signal min ($Y_1$, $M_1$, $C_1$), and at the same time produces and outputs density signals $C_2$, $M_2$ and $Y_2$ which are signals obtained by performing undercolor removal (UCR) of the input density signals $C_1$, $M_1$ and $Y_1$. A masking circuit 106 performs a well-known masking matrix operation in order to match the density signals $C_2$, $M_2$ and $Y_2$ with ink or the like in accordance with characteristics of the ink (toner or the like) of the printer 114. A gradation compensation circuit 107 compensates density signals $C_3$, $M_3$, $Y_3$ and $K_2$ after masking in accordance with gradation of the printer 114. Thus, outgoing signals $C_4$, $M_4$, $Y_4$ and $K_4$ for normal printer printing can be obtained. A gate circuit 113 inputs the above-described outgoing signals $C_4$, $M_4$, $Y_4$ and $K_4$, and selects and outputs only black signal $K_5$ (when it is judged to be a black picture element) or 4-primary-color signals $C_5$, $M_5$, $Y_5$ and $K_5$ (when it is judged to be other than a black picture element). The printer 114, for example a laser printer, forms a color image according to 4-primary-color signals $C_5$, $M_5$, $Y_5$ and $K_5$. Thus, an output image 115 is finally obtained.

A matrix conversion circuit 108 is the same circuit as the conversion circuit 18 shown in FIG. 1. A look-up table 109 inputs the above-described color-difference signals I and Q, and outputs a colorless-degree signal W which represents a degree of colorlessness of the color-differential signal by table conversion. The colorlessness-degree signal W in the present embodiment has a maximum value when the input is colorless (I=Q=0). The colorlessness-degree signal W in the present invention is related to the color-difference signals I and Q by, for example, the following Formula (9):

$$W = 255 \times exp[-(i/1024)^2 - (q/1024)^2] \qquad \text{Formula (9)}.$$

In the above-described Formula (9), the (exp) term on the right-hand side of the equation has a maximum value 1 when the input is colorless (I=Q=0), and accordingly the colorlessness-degree signal W has a maximum value 255 (8 bits). A multiplier 116 multiplies the above-described luminance signal y by the content of the colorlessness-degree signal W to produce a colorless luminance signal V. This conversion is expressed by $$V = (255 - y) \times W/255 \qquad \text{Formula (10)}.$$

In the above-described Formula (10), the luminance signal y in the right-hand part is introduced in the form (255−y) so that it has a larger value in a low-brightness region. Accordingly, the factor (255−y) becomes minimum when an input image is bright (a white region), and becomes maximum when an input image is dark (a black region). On the other hand, the factor (W/255) becomes 1 in a colorless region, and has a value not larger than 1 in a colored region. Consequently, the colorless luminance signal V, which is the product of the above-described two factors, has a maximum value 255 when the input is colorless and at the same time black, and has a smaller value when the input is white or gray though colorless. It will be noted that it is not always necessary to have the product of both factors as in the above-described colorless luminance signal V. It will be apparent that for example, by setting a suitable threshold value, a dark condition may be judged from (255−y), and a nearly colorless condition may be judged from (W), and then the logical product of these conditions may be obtained.

A line buffer 110 stores colorless luminance signals V covering 4 lines, which are necessary for a Hadamard transformation, to be described hereafter. Judgement of black picture elements by colorless luminance signals V may be individually performed for each picture element. However, considering a fact that images, such as black letters or the like, are generally distributed over fairly large regions compared with dimensions of a picture element (for example, 16 pel), or others, much more stable judgement and control of a black picture element can be performed by taking into consideration properties (whether in a letter or chart image region or in a photographic image region or the like) of images around a picture element in question, rather than by individually judging for each picture element. In the present embodiment, therefore, a line buffer which covers 4 lines is provided for performing judgement of 4×4 picture elements. An Hadamard transformation circuit 111 provides, for example, an Hadamard transformation matrix for 4×4 picuture elements.

Figure 10:
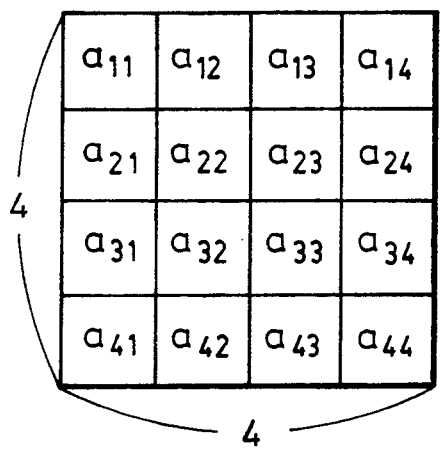
FIG. 10 is a diagram for explaining Hadamard transformation processing in the embodiment shown in FIG. 9.

FIG. 10 is a diagram explaining Hadamard transformation processing in the embodiment. In FIG. 10, a value of a colorless luminance signal V for each picture element is termed $a_{ij}$, and an object picture element is assumed to be a picture element $a_{22}$ in an appropriate intermediate position. Hadamard transformation $y_{kl}$ in this block region is represented by the following Formula (11):

$$y_{kl} = \frac{1}{16} \sum_{i=1}^{4} \sum_{j=1}^{4} C_{kl}(i, j) \times a_{ij} \qquad \text{Formula (11)}$$

Here, $C_{kl}(i, j)$ as a coefficient for obtaining a component of an order (k, l) in the Hadamard transformation, and some examples thereof are as follows:

$$C_{11}(i, j) = \begin{vmatrix} 1 & 1 & 1 & 1 \\ 1 & 1 & 1 & 1 \\ 1 & 1 & 1 & 1 \\ 1 & 1 & 1 & 1 \end{vmatrix}$$

-continued $$C_{12}(i,j) = \begin{vmatrix} 1 & 1 & -1 & -1 \\ 1 & 1 & -1 & -1 \\ 1 & 1 & -1 & -1 \\ 1 & 1 & -1 & -1 \end{vmatrix}$$

$$C_{21}(i,j) = \begin{vmatrix} 1 & 1 & 1 & 1 \\ 1 & 1 & 1 & 1 \\ -1 & -1 & -1 & -1 \\ -1 & -1 & -1 & -1 \end{vmatrix}$$

$$C_{44}(i,j) = \begin{vmatrix} 1 & -1 & 1 & -1 \\ -1 & 1 & -1 & 1 \\ 1 & -1 & 1 & -1 \\ -1 & 1 & -1 & 1 \end{vmatrix}$$

The Hadamard transformation $y_{kl}$ in the above-described Formula (11) represents a spatial structure of a black image in a block in question. When a value of Hadamard conversion $y_{kl}$ having a smaller order (k, l) is large, the block in question has an image having a flat brightness. When a value of Hadamard conversion $y_{kl}$ having a larger order (k, l) is large, it can be understood that the block has an image which includes edge components.

Returning now to FIG. 9, a judging circuit 112 judges whether the block in question belongs to a letter or chart region or not by, for example, the following judging means.

Figure 11:
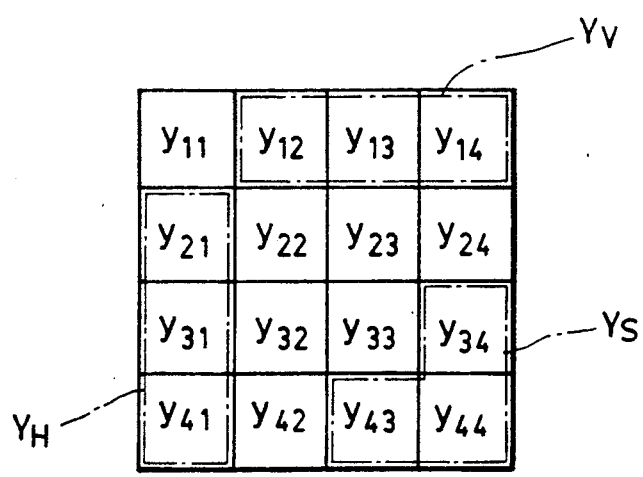
FIG. 11 is a diagram showing a $y_{k1}$ array in the Hadamard transformation in the embodiment shown in FIG. 9.

FIG. 11 is a diagram showing an array of Hadamard transformation $y_{kl}$ in the embodiment. In FIG. 11, $y_{11}$ represents an average value within a block. When the order k increases, edge components existing in a horizontal direction are detected, and when the order l increases, edge components existing in a vertical direction are detected. When the orders k and l increase, edge components existing in horizontal and vertical directions (mesh points or the like) are detected. In the present embodiment, the following values are then sought from the Hadamard transformation $y_{kl}$ obtained:

$Y_v = y_{12} + y_{13} + y_{14}$ $Y_H = y_{21} + y_{31} + y_{41}$ $Y_S = y_{44} + y_{34} + y_{43}$     Formula (12).

Accordingly, from the above-described formula, it is understood that when $Y_v$ has a large value, a vertical edge exists within a block in question, and when $Y_H$ has a large value, a horizontal edge exists, and when $Y_s$ has a large value, a complicated pattern, such as mesh points or the like, exists. Consequently, predetermined threshold values $T_1$, $T_2$ and $T_3$ are set, and it is judged that the block in question is a black-letter or black-chart region when the following conditions hold:

$(Y_V > T_1 \text{ or } Y_H > T_2)$ and also $Y_S < T_3$     Formula (13).

That is, the conditions are that a vertical edge or a horizontal edge exists, and at the same time there is no complicated pattern, such as mesh points. It will be noted that detection of a region having flat black can be performed by detecting from the start to the completion of detection of $Y_V > T_1$ or $Y_H > Y_2$ or by directly investigating $y_{11}$ by the predetermined threshold value. When a colorless black-letter region or the like has been identified by the foregoing process, signal S, as a result of judgement or identification, is input in the gate circuit 113, which usually outputs density signals $C_4$, $M_4$, $Y_4$ and $K_4$ as density outputs $C_5$, $M_5$, $Y_5$ and $K_5$ as they are. On the contrary, when a region is judged to be a black region as described above, each gate circuit for each color is switched on or off so that the density signals becomes $C_5 = 0$, $M_5 = 0$ and $Y_5 = 0$, and the density signal becomes $K_5 = K_4$. Thus, the above-described control is performed by shifting an object picture element one by one, and according to Hadamard conversion relative to an object block of neighboring picture elements at each moment of time.

Although an Hadamard transformation has been used in the above-described embodiment, the present invention is not to be limited thereto. For example, other orthogonal transformations may be used, or the maximum value and the minimum value of the signal V in an object block may be detected, and edge judgment may be performed by the amount of the difference between the both values.

Means for obtaining the colorlessness-degree signal W or the luminance signal Y are also not limited to the means described in the foregoing embodiments.

As described above, according to the present embodiment, it is possible to detect black-letter regions with excellent accuracy. Hence, it becomes possible to prevent turbidity in a color letter due to a wrong judgment or uneven color due to a judgment error for each color, and furthermore to remove turbidity, shading-off or the like from a black letter because the black letter itself can be output as unicolored black.

The embodiment shown in FIG. 9 is constituted so that the gate circuit 113 is switched according to an output of the judging circuit 112, but the invention is not limited thereto. An output of the judging circuit 112 may, for example, be input in the edge-amount conversion table 23 or in the edge emphasis circuit 16, instead of an output of the detection circuit 22.

On this occasion, three threshold values, for example, may be provided which are necessary for judgment at the judging circuit 112, and corrections as explained above wotj reference to FIGS. 6 (3) and 6 (4) may be performed by said three threshold values according to results judged in four stages.

It is to be noted that the present invention is not limited to the above-described embodiments, and variations and modifications may be made within the scope of the following claims.

What is claimed is:

1. An image processing apparatus comprising:
   a) first means for extracting an edge portion of an object image;
   b) second means for judging grayness of the object image, said grayness being a parameter indicative of chromaticity; and
   c) means for processing the object image according to outputs of said first means and second means.

2. An image processing apparatus according to claim 1 wherein said means for processing the image includes means for performing undercolor processing of the image.

3. An image processing apparatus according to claim 2 wherein said means for performing undercolor processing modifies its undercolor processing characteristics according to outputs of said first means and second means.

4. An image processing apparatus according to claim 1 wherein said first means is means for applying a Laplacian operator to data representing the image.

5. An image processing apparatus comprising:
a) first means for extracting an edge portion of an object image;
b) second means for judging grayness of the object image; and
c) means for processing the object image according to outputs of said first means and second means, wherein said second means includes:
  i) means for detecting I and Q components of the object image; and
  ii) means for obtaining an amount representative of $I^2+Q^2$ from the I and Q components for detecting grayness.

6. An image processing apparatus according to claim 2 wherein said means for performing undercolor processing includes:
a) means for undercolor removal from the object image; and
b) means for performing black-addition processing on the object image.

7. An image processing apparatus according to claim 6 wherein said undercolor removal means and black-addition processing means increase an amount of undercolor removal and an amount of black-addition, respectively, in a colorless and edge portion of the object image.

8. An image processing apparatus comprising:
a) first means for extracting a line region of an image;
b) second means for judging grayness of the image, said grayness being a parameter indicative of chromaticity; and
c) means for processing the image according to outputs of said first means and second means.

9. An image processing apparatus according to claim 8 wherein said first means extracts a line region of the image by a Hadamard transformation.

10. An image processing apparatus according to claim 8 wherein said means for processing the image includes means for performing undercolor processing of the image.

11. An image processing apparatus according to claim 10 wherein said means for performing undercolor processing modifies its undercolor processing characteristics according to outputs of said first means and second means.

12. An image processing apparatus according to claim 8 wherein said first means is means for applying a Laplacian operator to data representing the image.

13. An image processing apparatus comprising:
a) first means for extracting a line region of an image;
b) second means for judging grayness of the image; and
c) means for processing the image according to outputs of said first means and second means, wherein said second means further comprises:
  i) means for detecting I and Q components of the image; and
  ii) means for obtaining an amount representative of $I^2+Q^2$ from the I and Q components for detecting grayness.

14. An image processing apparatus according to claim 8 wherein said means for performing undercolor processing includes:
a) means for undercolor removal from the image; and
b) means for performing black-addition processing on the image.

15. An image processing apparatus according to claim 14 wherein said undercolor removal means and black-addition processing means increase an amount of undercolor removal and an amount of black-addition, respectively, in a colorless and line region of the image.

16. An image processing apparatus comprising:
a) first means for detecting grayness of an image, said grayness being a parameter indicative of chromaticity;
b) second means for detecting another characteristic of the image; and
c) means for judging a characteristic of the image according to outputs of said first means and second means.

17. An image processing apparatus comprising:
a) first means for detecting grayness of an image;
b) second means for detecting another characteristic of the image; and
c) means for judging a characteristic of the image according to outputs of said first means and second means, wherein said first means further comprises:
  i) means for detecting I and Q components of the image; and
  ii) means for obtaining an amount representative of $I^2+Q^2$ from the I and Q components for detecting grayness.

18. An image processing apparatus according to claim 16 wherein said second means is means for detecting an edge component of the image.

19. An image processing apparatus according to claim 18 wherein said means for judging is means which judges a region in the image as a black region by detection of its grayness by said first means to judge it as colorless and by detection of the edge component by said second means.

20. An image processing apparatus according to claim 1, wherein said second means judge said grayness based on a plurality of color components of the image.

21. An image processing apparatus according to claim 8, wherein said second means judge said grayness based on a plurality of color components of the image.

22. An image processing apparatus according to claim 16, wherein said first means judge said grayness based on a plurality of color components of the image.

23. An image processing method comprising the steps of:
extracting an edge portion of an object image;
judging grayness of the object image, said grayness being a parameter indicative of chromaticity; and
processing the object image according to outputs obtained in said extracting and judging steps.

24. An image processing method according to claim 23, wherein said processing step further comprises performing undercolor processing of the image.

25. An image processing method according to claim 24, wherein, in said undercolor processing, undercolor processing characteristics are modified according to outputs obtained in said extracting and judging steps.

26. An image processing method according to claim 23, wherein, in said extracting step, a Laplacian operator is applied to data representing the image.

27. An image processing method according to claim 24, wherein said undercolor processing further comprises the steps of:
performing undercolor removal from the object image; and performing black-addition processing on the object image.

28. An image processing method according to claim 27, wherein, in said undercolor removal and black-addition processing steps, an amount of undercolor removal and an amount of black-addition, respectively, are increased in a colorless and edge portion of the object image.

29. An image processing method according to claim 23, wherein, in said judging step, the grayness is judged based on a plurality of color components of the image.

30. An image processing method comprising the steps of:
   extracting a line region of an image;
   judging grayness of the image, said grayness being a parameter indicative of chromaticity; and
   processing the image according to outputs obtained in said extracting and judging steps.

31. An image processing method according to claim 30, wherein, in said extracting step, a line region of the image is extracted by a Hadamard transformation.

32. An image processing method according to claim 30, wherein said processing step further comprises performing undercolor processing of the image.

33. An image processing method according to claim 32, wherein, in said undercolor processing, undercolor processing characteristics are modified according to outputs obtained in said extracting and judging steps.

34. An image processing method according to claim 30, wherein said extracting step comprises applying a Laplacian operator to data representing the image.

35. An image processing method according to claim 30, wherein said undercolor removal processing further comprises the steps of:
   performing undercolor removal from the image; and
   performing black-addition processing on the image.

36. An image processing method according to claim 35, wherein, in said undercolor removal and black-addition processing steps, an amount of undercolor removal and an amount of black-addition, respectively, are increased in a colorless and edge portion of the image.

37. An image processing method according to claim 30, wherein, in said judging step, the grayness is judged based on a plurality of color components of the image.

38. An image processing method comprising the steps of:
   detecting grayness of an image, said grayness being a parameter indicative of chromaticity;
   detecting another characteristic of the image; and
   judging a characteristic of the image according to outputs obtained in said first and second detecting steps.

39. An image processing method according to claim 38, wherein said second detecting step further comprises detecting an edge component of the image.

40. An image processing method according to claim 39, wherein, in said judging step, a region in the image is judged as a black region by detection of its grayness in said first detecting step judging it as colorless and by detection of the edge component in said second detecting step.

41. An image processing method according to claim 38, wherein, in said first detecting step, the grayness is judged based on a plurality of color components of the image.

42. An image processing apparatus comprising:
   means for converting an object image into a color image signal;
   first means for extracting a line or edge region of the image;
   second means for judging grayness of the image, said grayness being a parameter indicative of chromaticity;
   means for processing the color image signal according to outputs of said first means and second means; and
   means for outputting color image signal processed by said processing means.

43. An image processing apparatus according to claim 42, wherein said outputting means comprises a color printer.

44. An image processing apparatus according to claim 42, wherein said first means comprises means for applying a Laplacian operator to image data representing the image.

45. An image processing apparatus according to claim 42, wherein said means for processing the color image signal comprises means for performing undercolor processing of the image.

46. An image processing apparatus according to claim 45, wherein said means for performing undercolor processing modifies its undercolor processing characteristics according to outputs of said first and second means.

47. An image processing apparatus according to claim 45, wherein said processing means process the color image signal as substantially unicolored black in a colorless and line or edge region of the image according to outputs of said first and second means.

48. An image processing apparatus according to claim 42, wherein said second means judge said grayness based on a plurality of color components of the image.

49. An image processing method comprising the steps of:
   converting an object image into color image signal;
   extracting a line or edge region of an image;
   judging grayness of the image, said grayness being a parameter indicative of chromaticity;
   processing the color image signal according to outputs obtained in said extracting and judging steps; and
   outputting color image signal processed in said processing step.

50. An image processing method according to claim 49, wherein said outputting step is performed using a color printer.

51. An image processing method according to claim 49, wherein said extracting step further comprises applying a Laplacian operator to image data representing the image.

52. An image processing method according to claim 49, wherein said processing step further comprises performing undercolor processing of the image.

53. An image processing apparatus according to claim 52, wherein, in said undercolor processing, undercolor processing characteristics are modified according to outputs obtained in said extracting and judging steps.

54. An image processing method according to claim 52, wherein, in said processing step, the color image signal is processed as substantially unicolored black in a colorless and line or edge region of the image, according to outputs obtained in said extracting and judging steps.

55. An image processing method according to claim 49, wherein, in said judging step, the grayness is judged based on a plurality of color components of the image.

* * * * *

UNITED STATES PATENT AND TRADEMARK OFFICE
CERTIFICATE OF CORRECTION

PATENT NO. : 5,126,838
DATED : June 30, 1992
INVENTOR(S) : HIDEFUMI OHSAWA, ET AL.

Page 1 of 2

It is certified that error appears in the above-identified patent and that said Letters Patent is hereby corrected as shown below:

COLUMN 4

Line 47, "$Y_3=\alpha_{13} \cdot Y_2+\alpha_{23} \cdot M_2+\alpha_{33} \cdot C_2$" should read
--$C_3=\alpha_{13} \cdot Y_2+\alpha_{23} \cdot M_2+\alpha_{33} \cdot C_2$--.

Line 60, "$Q=0.21 \times R_1-0.52 \times G_1-0.31 \times B_1$" should read
--$Q=0.21 \times R_1-0.52 \times G_1+0.31 \times B_1$--.

COLUMN 5

Line 38, "adder-subtractor 26." should read
--adder-subtracter 26.--.

COLUMN 6

Line 2, "become" should read --becomes--.

COLUMN 8

Line 26, "Judgement" should read --Judgment--.
Line 34, "judgement" should read --judgment--.
Line 41, "judgement" should read --judgment--.
Line 44, "picuture" should read --picture--.

COLUMN 9

Line 43, "$Y_v$" should read --$Y_v$--.
Line 50, "$Y_v$" should read --$Y_v$--.
Line 52, "$Y_s$" should read --$Y_s$--.
Line 66, "$Y_H>Y_2$" should read --$Y_H>T_2$--.

UNITED STATES PATENT AND TRADEMARK OFFICE
CERTIFICATE OF CORRECTION

PATENT NO. : 5,126,838
DATED : June 30, 1992
INVENTOR(S) : HIDEFUMI OHSAWA, ET AL.

It is certified that error appears in the above-identified patent and that said Letters Patent is hereby corrected as shown below:

COLUMN 10

Line 2, "judgement" should read --judgment--.
Line 43, "wotj" should read --with--.

Signed and Sealed this

Twenty-eighth Day of September, 1993

Attest:

BRUCE LEHMAN

Attesting Officer

Commissioner of Patents and Trademarks